US009066317B2

(12) United States Patent
Gou et al.

(10) Patent No.: US 9,066,317 B2
(45) Date of Patent: Jun. 23, 2015

(54) ORTHOGONAL FREQUENCY DIVISION MULTIPLEXING SYMBOL DISTRIBUTING METHOD AND SYSTEM FOR MULTIMEDIA BROADCAST MULTICAST SERVICE SINGLE FREQUENCY NETWORK SUB-FRAME

(75) Inventors: Wei Gou, Shenzhen (CN); Zijiang Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 180 days.

(21) Appl. No.: 13/386,005

(22) PCT Filed: Aug. 2, 2010

(86) PCT No.: PCT/CN2010/075632
§ 371 (c)(1),
(2), (4) Date: Jan. 19, 2012

(87) PCT Pub. No.: WO2011/018000
PCT Pub. Date: Feb. 17, 2011

(65) Prior Publication Data
US 2012/0120863 A1 May 17, 2012

(30) Foreign Application Priority Data
Aug. 11, 2009 (CN) .......................... 2009 1 0090435

(51) Int. Cl.
H04W 4/06 (2009.01)
H04W 72/00 (2009.01)
H04L 5/00 (2006.01)
H04W 28/04 (2009.01)
H04W 72/04 (2009.01)
H04W 72/08 (2009.01)

(52) U.S. Cl.
CPC ........... *H04W 72/005* (2013.01); *H04L 5/0007* (2013.01); *H04L 5/001* (2013.01); *H04W 4/06* (2013.01); *H04W 28/04* (2013.01); *H04W 72/0453* (2013.01); *H04W 72/082* (2013.01)

(58) Field of Classification Search
CPC .................................................. H04L 12/185
USPC .......................................... 370/312, 431, 432
See application file for complete search history.

(56) References Cited

U.S. PATENT DOCUMENTS

| 2009/0156225 A1* | 6/2009 | Angelow et al. .............. 455/450 |
| 2010/0128646 A1* | 5/2010 | Gao .............................. 370/312 |
| 2010/0315963 A1* | 12/2010 | Jading et al. ................. 370/252 |
| 2012/0093060 A1* | 4/2012 | Huschke et al. ............. 370/312 |

FOREIGN PATENT DOCUMENTS

| CN | 101184076 | 5/2008 |
| CN | 101286812 | 10/2008 |
| WO | 2008118064 | 10/2008 |

OTHER PUBLICATIONS

3rd Generation Partnership Project, Technical Specification Group Radio Access Network; "Evolved Universal Terrestrial Radio Access (E-UTRA) Radio Resource Control (RRC); Protocol specification", 3GPP TS 36.331 V8.6.0 (Jun. 2009), Total pp. 207.*
PCT/CN2010/075632, International Search Report, Nov. 11, 2010.

* cited by examiner

*Primary Examiner* — Andrew Chriss
*Assistant Examiner* — Peter Mak
(74) *Attorney, Agent, or Firm* — Kunzler Law Group

(57) ABSTRACT

The present invention provides an Orthogonal Frequency Division Multiplexing (OFDM) symbol distributing method for Multimedia Broadcast multicast service Single Frequency Network (MBSFN) sub-frame. According to the uniform configuration rules, an OFDM symbol distributing system distributes the OFDM symbols in all MBSFN sub-frames bearing the transmission of the Multi-cell transmission Multimedia Broadcast Multicast Service (MBMS) in the MBMSFN domain. The present invention also correspondingly provides an OFDM symbol distributing system for MBSFN sub-frame. By configuring the OFDM symbols occupied by the PDCCH in the MBSFN sub-frame bearing the Multi-cell transmission MBMS, the present invention increases the frequency of the OFDM symbol that is occupied by the PDCCH bearing the MBMS in the MBSFN sub-frame, so as to effectively use the resource and avoid the interference to the PDCCH due to the MBMS data transmission to a certain extent.

11 Claims, 6 Drawing Sheets

The OFDM symbols used by the PDCCH

The OFDM symbols used by the MBMS service

The OFDM symbols used by the PDCCH

The OFDM symbols used by the MBMS service

ORTHOGONAL FREQUENCY DIVISION MULTIPLEXING SYMBOL DISTRIBUTING METHOD AND SYSTEM FOR MULTIMEDIA BROADCAST MULTICAST SERVICE SINGLE FREQUENCY NETWORK SUB-FRAME

FIELD OF THE INVENTION

The present invention relates to the field of Multimedia Broadcast Multicast Service (MBMS), and more especially, to an Orthogonal Frequency Division Multiplexing (OFDM) symbol distributing method and system for the Multimedia Broadcast multicast service Single Frequency Network (MBSFN) sub-frame.

BACKGROUND

With the rapid development of the Internet and the popularity of large-screen multi-function mobile phones, there have been a large number of mobile data multimedia services and a variety of broad bandwidth multimedia services such as: video conferencing, TV broadcasting, video on demand, advertising, online education, interactive games, and so on, which meets the increasing service needs of the mobile users on the one hand, and meanwhile brings new service growth point for mobile operators. These mobile data multimedia services require multiple users to simultaneously receive the same data, compared with typical data services, it has features such as large data amount, long duration and delay sensitivity.

In order to effectively use the mobile network resources, the third Generation Partnership Project (3GPP) proposes the MBMS service, this service is a technology of transmitting data from one data source to multiple targets to achieve the sharing of the network (including the core network and access network) resources and to improve the utilization of the network resources (especially the air interface resource). The MBMS service defined in the 3GPP can achieve the broadcast and multicast of not only the low-speed text messages but also the high-speed multimedia services, so as to provide a variety of enriched videos, audios and multimedia services, which undoubtedly conforms to the future mobile data development trends and provides better service prospects for the 3G development.

The Long Term Evolution (LTE) Release 8/9 specifies using the MBSFN sub-frame to transmit the MBMS service, but not all MBSFN sub-frames are used to transmit the MBMS service, for example, some MBSFN sub-frames are also used for positioning service, relay service, and so on. It should be noted that, so far only the multi-cell transmission MBMS service is considered in the LTE Release 8/9, while the single-cell transmission MBMS service is not considered, and to date, the multi-cell transmission MBMS service must use the MBSFN sub-frame to bear and send, while the single-cell transmission MBMS service might use the MBSFN sub-frame to bear and send. Wherein, the specific definition of the multi-cell transmission MBMS service can refer to the 36.331 protocol, and the basic feature thereof is sending the MBMS service via the Physical Multicast Channel (PMCH) or bearing the MBMS service via the Multicast Channel (MCH).

Currently, the LTE specifies using the two-level method to configure the radio frames and sub-frames bearing the MBMS, and the method is described as follows:

The first level implements the configuration of the radio frames bearing the MBMS, and it meets the following equation:

$$\text{SFN mod radioFrameAllocationPeriod} = \text{radioFrameAllocationOffset}$$

Where, SFN is the abbreviation of System Frame Number, that is, the system radio frame number, from 0 to 1023; radioFrameAllocationPeriod denotes the MBSFN radio frame period which can be any value from $\{1, 2, 4, 8, 16, 32\}$; radioFrameAllocationOffset is the MBSFN radio frame offset and its value is smaller than the selected MBSFN radio frame period and is an integer no less than 0; "mod" denotes acquiring the modulus or remainder of the SFN to the radioFrameAllocationPeriod. The radio frames configured for bearing the MBMS service are called the MBSFN radio frames.

The second level achieves the configuration of the sub-frames bearing the MBMS service in the MBSFN radio frames, generally using the bitmap method. As specified in the LTE, the sub-frames #0, #4, #5 and #9 in the frequency division duplex (FDD) mode cannot bear the MBMS service, nor do the sub-frames #0, #1, #5 and #6 in the time division duplex (TDD) mode, thus, the 6-bit bitmap is used to describe which ones in the remaining six sub-frames are used to bear the MBMS service, and the configurations of the sub-frames bearing the MBMS service in each MBSFN radio frame are the same. As the two-level configuration signaling is sent in the Broadcast Control Channel (BCCH) to the terminal, the configurations of the sub-frames in the MBSFN radio frames in each BCCH modification period cannot be changed. The aforementioned sub-frame bearing the MBMS service in the MBSFN radio frame is called MBSFN sub-frame, also known as multicast sub-frame.

The MBSFN sub-frames used to bear the MBMS service use the extended cyclic prefix, such MBSFN sub-frame has 12 OFDM symbols, where the first one or two OFDM symbols are used for transmitting the control information of the unicast service, also known as Physical Downlink Control Channel (PDCCH), the remaining resources in such sub-frame are used to send the MBMS service, in the current LTE R9, the scheduling of the MBMS service is a semi-static scheduling, and the MBMS service in this period is achieved via the scheduling period. Thus, the MBMS is configured once in one period, that is, at the beginning of each scheduling period, the system needs to allocate resources for sending the MBMS service in this scheduling period and assign what specific MBMS service will be sent in which resources, all these are uniformly configured by each cell in the MBSFN domain.

In general, to send the MBMS service in one MBSFN domain, it needs each cell participating the sending provides the same idle resources, and the MBMS service is sent on the same resources. If any cell A in the MBSFN domain cannot provide the same resources, then the MBMS service cannot be sent in these resources within the entire MBSFN domain, or, if the MBMS service is sent in this case, the performance of other services sent by the cell A in these resources will be affected. In the present invention, the $2^{nd}$ OFDM symbol in the MBSFN sub-frame happens to have the similar problem, that is, the $2^{nd}$ OFDM symbol in such a sub-frame potentially has the risk of being unable to send the MBMS service, and the specific analysis is as follows:

First of all, the characteristics and the necessary conditions for the MBMS service transmission of the multi-cell transmission MBMS service are given: multi-cell transmission MBMS service is characterized by using the MBSFN combination method to air interface combine the data of the same MBMS service sent by each cell in the MBSFN domain. In view of this, the transmission of the multi-cell transmission MBMS service must meet the following conditions, in short, the electromagnetic waves of the MBMS data sent by each cell involved in transmitting the MBMS service in the MBSFN domain should be identical, so that the electromagnetic signals from different cells can be naturally superposed in the air to enhance the signal performance. Specifically, the same frequency and time resources are used to send the data in the same format.

Second, analyzing the number of OFDM symbols occupied by the PDCCH of each cell. In short, the number of OFDM symbols occupied by the PDCCH of each cell is decided by the cell itself, for example, the number of OFDM symbols occupied by the PDCCH of each cell is decided according to the number of user terminals in the cell or the characteristics of the user terminals (such as multi-antenna terminals). For example, each cell determines the number of OFDM symbols used by its PDCCH according to the number of users to be scheduled in the cell at this time, that is, when the local cell has a relatively large number of users to be scheduled, the PDCCH uses the first two OFDM symbols, otherwise, the PDCCH uses the first one OFDM symbol while not the second one. Specifically, the $2^{nd}$ OFDM symbol might be occupied by the PDCCH, and whether it is occupied or not is mainly determined by the cell itself, therefore, in a MBSFN domain, the PDCCH of some cells occupy the first two OFDM symbols in the MBSFN sub-frame, while others only occupy the $1^{st}$ OFDM symbol in the MBSFN sub-frame. With the increasing number of cells in the MBSFN domain, it is difficult to find at one MBSFN sub-frame in this MBSFN domain that the PDCCH of all cells in the domain occupies the first two OFDM symbols or the $1^{st}$ OFDM symbol. Only when the PDCCH of all cells occupies the $1^{st}$ symbol can the $2^{nd}$ OFDM symbol of this MBSFN sub-frame be used to transmit the MBMS service, however, the probability of this case is very small.

A scenario is given in the following to illustrate that the $2^{nd}$ OFDM symbol is potentially unable to send the MBMS service. For example, FIG. 1 illustrates an example that there are multiple cells in the MBSFN domain, as shown in FIG. 1, if all the cells in the MBSFN domain in the figure are involved in the transmission of the MBMS service and cell 1 and cell 2 need to schedule a relatively large number of users, the PDCCH of the cell 1 and the cell 2 use the first two OFDM symbols, while the PDCCH of other cells in the domain only use the first one OFDM symbol. In this case, the $2^{nd}$ OFDM symbol is not the resources shared by multiple cells in the MBSFN domain, and the cells in the MBSFN domain cannot use the $2^{nd}$ OFDM symbol to send the MBMS service, which will result in system resource waste; If the $2^{nd}$ OFDM symbol is forced to send the MBMS service, since the multi-cell transmission MBMS service has air interface superimposed gain, the PDCCH information transmitted in the $2^{nd}$ OFDM symbol by few cells (for example, the cell 1 and the cell 2) will be strongly interfered with each other because most cells send the MBMS data in the $2^{nd}$ OFDM symbol, so that the PDCCH information of these few cells cannot be received normally.

SUMMARY

In view of this, the main purpose of the present invention is to provide an OFDM symbol distributing method and system for MBSFN sub-frame to effectively use resources and to avoid the interference to the PDCCH due to the transmission of the MBMS data to a certain extent.

To achieve the aforementioned purpose, the technical scheme of the present invention is implemented as:

An Orthogonal Frequency Division Multiplexing (OFDM) symbol distributing method for Multimedia Broadcast multicast service Single Frequency Network (MBSFN) sub-frame, comprising: according to uniform configuration rules, the OFDM symbol distributing system distributing the OFDM symbols in all the MBSFN sub-frames bearing the transmission of multi-cell transmission Multimedia Broadcast Multicast Service (MBMS) in a MBSFN domain.

The configuration rules are: uniformly segmenting the MBSFN sub-frames in each cell involved in the transmission of the MBMS in the MBSFN domain, and uniformly configuring the OFDM symbols occupied by physical downlink control channel (PDCCH) of the MBSFN sub-frames in each segment.

Said distributing the OFDM symbols in all the MBSFN sub-frames bearing the MBMS according to the uniform configuration rules comprises: each cell distributing the corresponding OFDM symbols in the MBSFN sub-frames to the PDCCH according to the configuration rules of configuring the OFDM symbols for the PDCCH, and distributes the remaining OFDM symbols in the MBSFN sub-frames to the MBMS.

Said segmenting the MBSFN sub-frames is: segmenting the MBSFN sub-frames according to MBMS dynamic scheduling period, multicast control channel (MCCH) modification period, Broadcast Control Channel (BCCH) modification period, or a finite number of successive MBSFN radio frames, or a finite number of successive MBSFN sub-frames.

Uniform configuration in each segment in each cell in the MBSFN domain is: the OFDM symbols occupied by the PDCCH of all the MBSFN sub-frames bearing the MBMS are the same in each segment, that is, the PDCCH of all the MBSFN sub-frames bearing the MBMS in each segment in each cell in the MBSFN domain occupies the first OFDM symbol or the first two OFDM symbols.

Uniform configuration in each segment in each cell in the MBSFN domain is: the OFDM symbols occupied by the PDCCH of all the MBSFN sub-frames bearing the MBMS are different within the segment, that is, the PDCCH of a part of all the MBSFN sub-frames bearing the MBMS in each segment in each cell in the MBSFN domain occupies the $1^{st}$ OFDM symbol, and the PDCCH of the remaining MBSFN sub-frames occupies the first two OFDM symbols.

Said OFDM symbol distributing system comprises: a base station to which all the cells bearing the MBMS in the MBSFN domain belong and the parent node of the base station, The process of said OFDM symbol distributing system distributing the OFDM symbols in all MBSFN sub-frames bearing the multi-cell transmission MBMS in the MBSFN domain according to the uniform configuration rules is:

The base station to which all the cells bearing the MBMS in the MBSFN domain belong receives the configuration rules sent by the parent node and used to configure the OFDM symbols for the PDCCH of all MBSFN sub-frames bearing the multi-cell transmission MBMS.

According to the received configuration rules, the base station generates a control signaling for the PDCCH of the corresponding MBSFN sub-frame occupying the OFDM symbols, and configures the MBSFN sub-frames according to the control signaling;

The base station sends the generated control signaling to the terminal.

The OFDM symbol distributing system comprises: a base station to which all the cells bearing the MBMS in the MBSFN domain belong and the parent node of the base station, Said OFDM symbol distributing system distributing the OFDM symbols in all MBSFN sub-frames bearing the multi-cell transmission MBMS in the MBSFN domain according to the uniform configuration rules is:

the parent node of the base station to which all the cells bearing the MBMS in the MBSFN domain belong generates a control signaling for the PDCCH of the corresponding MBSFN sub-frames occupying the OFDM symbols;

the parent node of the base station sends the generated control signaling to the base station to which all the cells bearing the MBMS belong;

after receiving the control signaling sent from the parent node, the base station configures the MBSFN sub-frame according to the control signaling and forwards the control signaling to the terminal.

The OFDM symbol distributing system is the base station to which all the cells bearing the MBMS in the MBSFN domain belong, said OFDM symbol distributing system distributing the OFDM symbols in all MBSFN sub-frames bearing the multi-cell transmission MBMS in the MBSFN domain according to the uniform configuration rules is:

the base station to which all the cells bearing the MBMS in the MBSFN domain belong configures the OFDM symbols according to the fixed configuration rules of configuring the OFDM symbols for the PDCCH of all the MBSFN sub-frames;

according to the configuration rules, the base station generates a corresponding control signaling for the PDCCH of all the MBSFN sub-frames occupying the OFDM symbols, and configures the MBSFN sub-frames according to the control signaling;

the base station sends the generated control signaling to the terminal.

An OFDM symbol distributing system for MBSFN sub-frame, comprising: a configuration rule provision unit, a control signaling generation unit and a control signaling transmission unit, wherein, the configuration rule provision unit is used to provide the uniform configuration rules;

the control signaling generation unit is used to generate the control signaling for the PDCCH of the corresponding MBSFN sub-frames occupying the OFDM symbols according to the configuration rules provided by the configuration rule provision unit, and to configure the MBSFN sub-frames according to the control signaling;

the control signaling transmission unit is used to send the control signaling generated by the control signaling generation unit to the terminal.

The configuration rule provision unit is located in the parent node of the base station to which all the cells bearing the MBMS in the MBSFN domain belong;

the control signaling generation unit and the control signaling transmission unit are located in the base station to which the cells bearing the MBMS in the MBSFN domain belong.

Said configuration rule provision unit and the control signaling generation unit are located within the parent node of the base station to which all the cells bearing the MBMS in the MBSFN domain belong;

said control signaling transmission unit is located in the base station to which the cells bearing the MBMS in the MBSFN domain belong, and also located in the parent node of the base station.

The configuration rule provision unit, the control signaling generation unit and the control signaling transmission unit are located in the base station to which the cells bearing the MBMS in the MBSFN domain belong.

The configuration rules provided by the configuration rule provision unit are: uniformly segmenting the MBSFN sub-frames in each cell involved in the MBMS in the MBSFN domain, and uniformly configuring the OFDM symbols occupied by the PDCCH of the MBSFN sub-frames in each segment.

The control signaling generation unit configuring the MBSFN sub-frames is: distributing the corresponding OFDM symbols in the MBSFN sub-frames to the PDCCH according to the configuration rules of configuring the OFDM symbols for the PDCCHs, and distributing the remaining OFDM symbols in the MBSFN sub-frames to the MBMS.

The configuration rule provision unit segmenting the MBSFN sub-frames is: segmenting the MBSFN sub-frames according to the MBMS dynamic scheduling period, or the multicast control channel (MCCH) modification period, or the Broadcast Control Channel (BCCH) modification period, or a finite number of successive MBSFN radio frames, or a finite number of successive MBSFN sub-frames.

Uniformly configuring the OFDM symbols occupied by the PDCCH of the MBSFN sub-frames in each segment in the configuration rules provided by the configuration rule provision unit comprises: the OFDM symbols occupied by the PDCCH of all the MBSFN sub-frames bearing the MBMS are the same in one segment, that is, the PDCCH of all the MBSFN sub-frames bearing the MBMS in each segment in each cell in the MBSFN domain occupies the $1^{st}$ OFDM symbol or the first two OFDM symbols.

By configuring the OFDM symbols occupied by the PDCCH of the MBSFN sub-frames bearing the multi-cell transmission MBMS, the OFDM symbol distributing method and system for the MBSFN sub-frames in accordance with the present invention can increase the frequency of the OFDM symbols occupied by the PDCCH bearing the MBMS in the MBSFN sub-frames, so as to efficiently use the resources; moreover, after assigning the OFDM symbols occupied by the PDCCH, there is no chance that different cells use the OFDM symbols at the same positions in the MBSFN sub-frames to send the PDCCH information and the MBMS data, thereby avoiding the interference to the PDCCH due to the MBMS data transmission to a certain extent.

DETAILED DESCRIPTION

The basic idea of the present invention is: by configuring the OFDM symbols occupied by the PDCCH of all MBSFN sub-frames bearing the multi-cell transmission MBMS service, increasing the frequency of the OFDM symbols bearing the MBMS service, wherein the OFDM symbols might be occupied by the PDCCH of the MBSFN sub-frames.

The implementation of the technical scheme will be described in further detail in combination with the accompanying figures.

To data, it specifies for the MBSFN sub-frames in the LTE that, the first two OFDM symbols in the MBSFN sub-frame can be used for the PDCCH, and the PDCCH uses at least one OFDM symbol. The present invention specifies that the OFDM symbol must be used by the PDCCH is the $1^{st}$ OFDM symbol in the MBSFN sub-frame; the OFDM symbol might be used by the PDCCH is the $2^{nd}$ OFDM symbol in the MBSFN sub-frame, specifically, the base station decides whether the PDCCH uses the first OFDM symbol or the first two OFDM symbols according to the number of terminals to be scheduled by the cell or the type of the terminals to be scheduled by the cell.

It should be pointed out that, since the single-cell transmission MBMS service is transmitted with the resources selected by the cell itself, it does not need to uniformly distribute the resources, thus it does not have the problem in the multi-cell transmission MBMS service in the prior art, and all the MBMS services illustrated in the following are the multi-cell transmission MBMS services.

The OFDM symbol distributing method for the MBSFN sub-frames in accordance with the present invention is: according to the uniform configuration rules, the OFDM symbol distributing system distributes the OFDM symbols in all the MBSFN sub-frames bearing the MBMS service in the cell bearing the transmission of multi-cell transmission MBMS service in the MBSFN domain.

Figure 1:
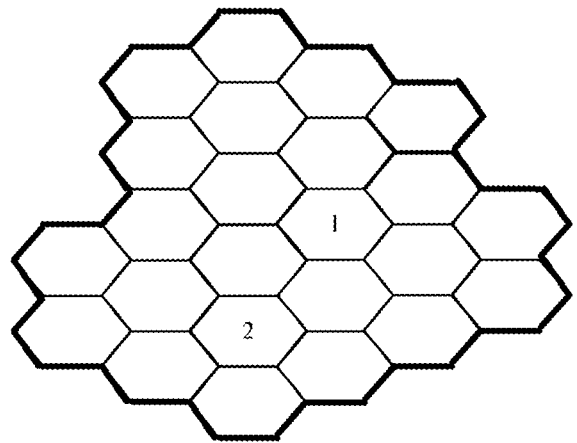
FIG. 1 illustrates an example that the MBSFN domain has multiple cells.
Figure 2:
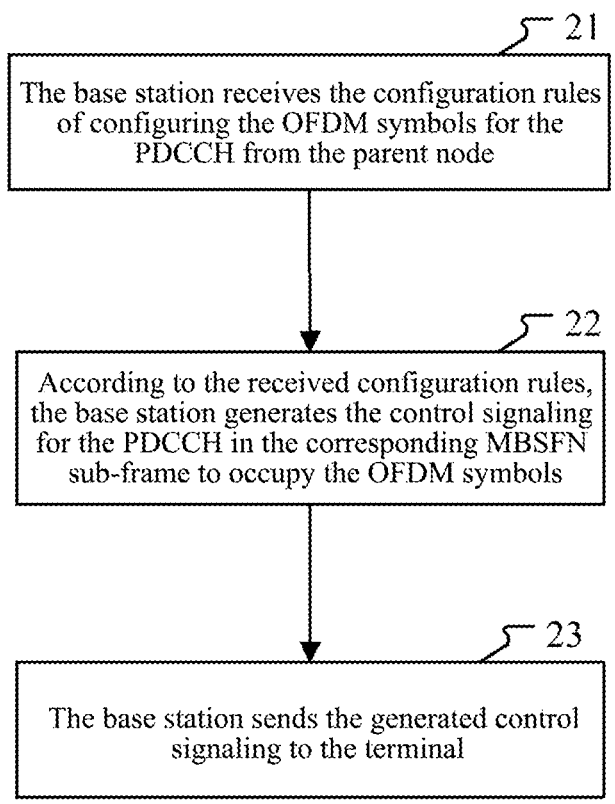
FIG. 2 is a flow chart of the OFDM symbol distributing method for the MBSFN sub-frames in accordance with the present invention, when the parent node of the base station sends the uniform configuration rules to the base station to which all the cells bearing the MBMS service in the MBSFN domain belong.

Herein, there are the following specific implementation methods for distributing the OFDM symbols in all the MBSFN sub-frames bearing the MBMS service in the cell bearing the transmission of the multi-cell transmission MBMS service in the MBSFN domain:

For example, the uniform configuration rules might be sent by the parent node of the base station to the base station to which all the cells bearing the MBMS service in the MBSFN domain belong, that is, the OFDM symbol distributing system comprises: the base station to which all the cells bearing the MBMS service in the MBSFN domain belong and the parent node of the base station, wherein, the parent node of the base station is the multi-cell/multicast coordination entity (MCE) in the LTE. FIG. 2 is a flow chart of the OFDM symbol distributing method for the MBSFN sub-frames in accordance with the present invention, when the parent node of the base station sends the uniform configuration rules to the base station to which all the cells bearing the MBMS service in the MBSFN domain belong, as shown in FIG. 2, the OFDM symbol distributing method for MBSFN sub-frames comprises:

Step 21: the base station receives the configuration rules of configuring the OFDM symbols for the PDCCH from the parent node.

Herein, the base station is the base station to which all the cells bearing the MBMS service in the MBSFN domain belong.

Step 22: according to the received configuration rules, the base station generates the control signaling for the PDCCH in the corresponding MBSFN sub-frame occupying the OFDM symbols.

Herein, the base station generally also needs to configure the MBSFN sub-frame according to the control signaling.

Step 23: the base station sends the generated control signaling to the terminal.

Figure 3:
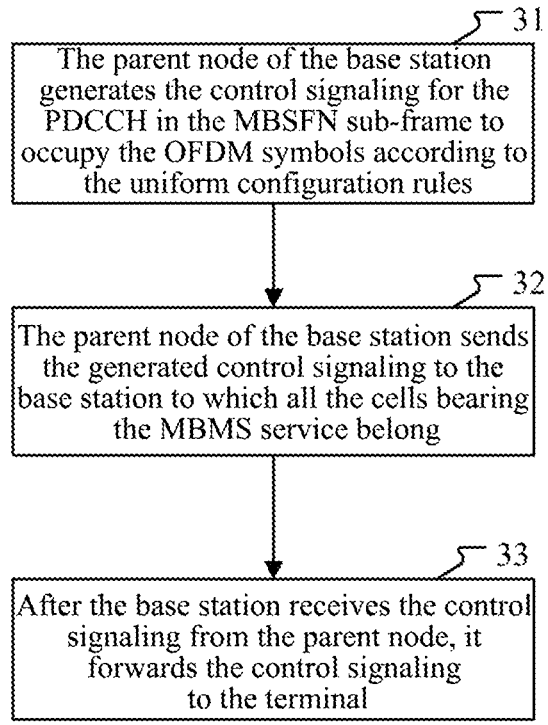
FIG. 3 is a flow chart of the OFDM symbol distributing method for the MBSFN sub-frames in accordance with the present invention, when the parent node of the base station generates and sends the control signaling to the base station to which all the cells bearing the MBMS service in the MBSFN domain belong according to the uniform configuration rules.

For another example, the parent node (the MCE in the LTE) of the base station generates a control signaling for the PDCCH in the MBSFN sub-frame to occupy the OFDM symbols according to the uniform configuration rules and sends the control signaling to the base station to which all the cells bearing the MBMS service in the MBSFN domain belong, so as to achieve the distribution of the OFDM symbols in the MBSFN sub-frame, at this point, the OFDM symbol distributing system also comprises: the base station to which all the cells bearing the MBMS service in the MBSFN domain belong and the parent node of the base station. Where, the parent node of the base station is typically the MCE. FIG. 3 is a flow chart of the OFDM symbol distributing method for the MBSFN sub-frames in accordance with the present invention, when the parent node of the base station generates the control signaling and sends the control signaling to the base station to which all the cells bearing the MBMS service in the MBSFN domain belong according to the uniform configuration rules, as shown in FIG. 3, the OFDM symbol distributing method for the MBSFN sub-frame comprises:

Step 31: the parent node of the base station generates the control signaling for the PDCCH in the MBSFN sub-frame to occupy the OFDM symbols according to the uniform configuration rules.

Herein, the base station is the base station to which all the cells bearing the MBMS service in the MBSFN domain belong.

Step 32: the parent node of the base station sends the generated control signaling to the base station to which all the cells bearing the MBMS service belong.

Step 33: after the base station receives the control signaling from the parent node, it forwards the control signaling to the terminal.

Herein, after the base station receives the control signaling from the parent node, it generally needs to configure the MBSFN sub-frames according to the control signaling.

Figure 4:
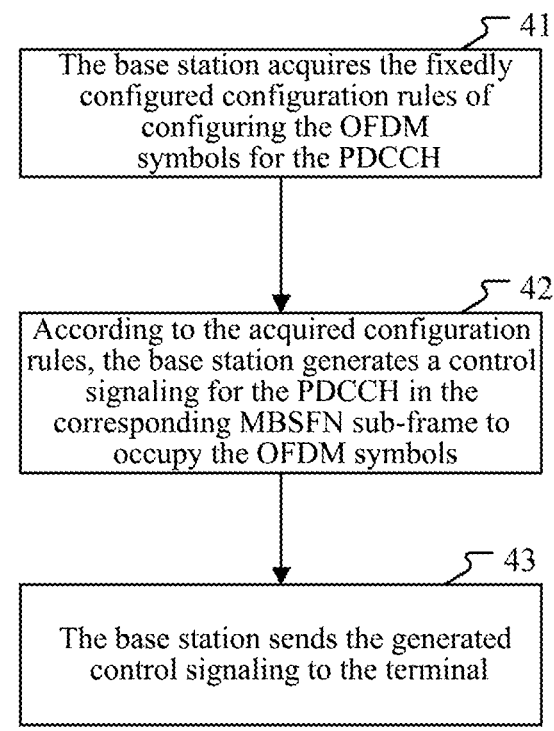
FIG. 4 is a flow chart of the OFDM symbol distributing method for the MBSFN sub-frames in accordance with the present invention, when the configuration rules are fixedly configured in the base station.

For another example, the configuration rules may be fixedly configured in the base station, and the base station directly acquires the fixedly configured configuration rules and implements the distribution of the OFDM symbols in the MBSFN sub-frame, that is, the OFDM symbol distributing system is the base station to which all the cells bearing the MBMS service in the MBSFN domain belong, FIG. 4 is a flow chart of the OFDM symbol distributing method for the MBSFN sub-frames in accordance with the present invention, when the configuration rules are fixedly configured in the base station, as shown in FIG. 4, the OFDM symbol distributing method for the MBSFN sub-frames comprises:

Step 41: the base station acquires the fixedly configured configuration rules of configuring the OFDM symbols for the PDCCH.

Herein, the base station is the base station to which all the cells bearing the MBMS service in the MBSFN domain belong.

Step 42: according to the acquired configuration rules, the base station generates a control signaling for the PDCCH in the corresponding MBSFN sub-frame to occupy the OFDM symbols.

Herein, after the base station generates the control signaling for the PDCCH in the corresponding MDSFN sub-frame to occupy the OFDM symbols, it generally also needs to configure the MBSFN sub-frame according to the control signaling.

Step 43: the base station sends the generated control signaling to the terminal.

The aforementioned configuration rules are generally: uniformly segmenting the MBSFN sub-frames in each cell involved in the MBMS service in the MBSFN domain, and uniformly configuring the OFDM symbols occupied by the PDCCH of the MBSFN sub-frames in each segment. Herein, the size of each segment might be: the MBMS dynamic scheduling period, or the MCCH modification period, or the BCCH modification period, or a finite number of successive MBSFN radio frames, or a finite number of successive MBSFN sub-frames. It should be noted that, the successive MBSFN radio frames mentioned here are not for all the radio frames, for example, there are totally 10 radio frames, wherein, those numbered as 1, 3, 5, 7 and 9 are the MBSFN radio frames, and the others are not the MBSFN radio frames, if 4 successive MBSFN radio frames are a segment, those numbered as 1, 3, 5 and 7 rather than 1, 2, 3 and 4 are a segment. The successive MBSFN sub-frames are similar. Moreover, it might also include the non-MBSFN radio frames in the segmenting process, that is, the non-successive MBSFN radio frames, for example, there are totally 10 radio frames, and those numbered as 1, 3, 5, 7, and 9 are MBSFN radio frames, and the others are non-MBSFN radio frames, if four successive MBSFN radio frames are a segment, this segment is the MBSFN radio frames numbered as 1, 2, 3, and 4. The non-successive MBSFN sub-frames are similar.

In addition, the OFDM symbols occupied by the PDCCH of each MBSFN sub-frame in each segment might be same, for the existing LTE system, that is, the PDCCH of each MBSFN sub-frame occupies the first OFDM symbol or the first two OFDM symbols; the OFDM symbols occupied by the PDCCH of each MBSFN sub-frame in each segment might be different, for the existing LTE system, the PDCCH of some MBSFN sub-frames in the segment occupies the $1^{st}$ OFDM symbol, and the PDCCH of the remaining MBSFN sub-frames occupies the first two OFDM symbols.

Correspondingly, according to the uniform configuration rules, the process of distributing the OFDM symbols in the MBSFN sub-frames bearing the MBMS service is: according to the configuration rules of configuring the OFDM symbols for the PDCCHs, each cell distributes the corresponding OFDM symbols in the MBSFN sub-frames to the PDCCH, and the remaining OFDM symbols to the MBMS service.

In combination with the content of the present invention, the PDCCH of the MBSFN sub-frame in the current LTE R9 uniformly uses the first OFDM symbol or the first two OFDM symbols, that is, the $2^{nd}$ and the following OFDM symbols is used uniformly to send the MBMS service in the MBSFN sub-frames, or the $3^{rd}$ and the following OFDM symbols are used uniformly to send the MBMS service in the MBSFN sub-frames. The base station can make segments according to the MBMS dynamic scheduling period, or the MCCH modification period, the BCCH modification period, a finite number of successive MBSFN radio frames, or a finite number of successive MBSFN sub-frames, so as to adjust the OFDM symbol resources used by the MBMS service.

With the aforementioned method, if configuring the first OFDM symbol to be used by the PDCCH of the MBSFN sub-frame bearing the MBMS service in all the cells involved in the MBMS transmission in the MBSFN domain in one MBMS dynamic scheduling period, even if the number of user terminals in a certain cell in the MBSFN domain is relatively large, the PDCCH of the cell cannot occupy the $2^{nd}$ OFDM symbol, so that it guarantees that the second OFDM symbol in the MBSFN sub-frame bears the MBMS service, that is, the OFDM symbols occupied by the PDCCH surely can be used to send the MBMS data, so as to improve the resource utilization; moreover, if configuring the first two OFDM symbols to used uniformly by the PDCCH in the MBSFN sub-frame bearing the MBMS service in all the cells involved in the MBMS service transmission in one MBSFN domain in one MBMS dynamic scheduling period, even if the number of user terminals in a certain cell in the MBSFN domain is relatively small, the MBMS service in this cell still do not occupy the $2^{nd}$ OFDM symbol to send the MBMS data, thus avoid the interference to the PDCCH due to the MBMS data transmission to a certain extent.

It should be noted that, the OFDM might be used or not used by the PDCCH in the present invention is called an OFDM symbol that might be occupied by the PDCCH. According to the existing LTE protocol, the $2^{nd}$ OFDM in the MBSFN sub-frame is the OFDM symbol that might be occupied by the PDCCH, since the first OFDM is surely used by the PDCCH, it is not an OFDM symbol that might be occupied by the PDCCH. Considering that the number of OFDM symbols occupied by the PDCCH in the following MBSFN sub-frames is defined as 1 (the first OFDM symbol) or 2 (the first and second OFDM symbols), or 3 (the first, second and third OFDM symbols), therefore, the OFDM symbols might be occupied by the PDCCH in the MBSFN sub-frames are not limited to the $2^{nd}$ OFDM symbol.

Figure 5:
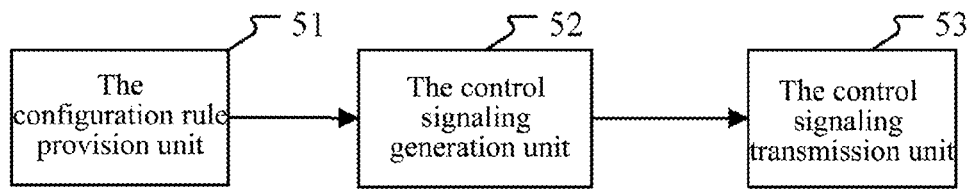
FIG. 5 is a structural diagram of the OFDM symbol distributing system for the MBSFN sub-frames in accordance with the present invention.

FIG. 5 is a structural diagram of the OFDM symbol distributing system for the MBSFN sub-frames in accordance with the present invention, as shown in FIG. 5, the OFDM symbol distributing system for the MBSFN sub-frames in the present invention comprises: the configuration rule provision unit 51, the control signaling generation unit 52 and the control signaling transmission unit 53, wherein, the configuration rule provision unit 51 is used to provide uniform configuration rules;

the control signaling generation unit 52 is used to generate a control signaling for the PDCCH in the corresponding MBSFN sub-frame to occupy the OFDM symbols according to the configuration rules provided by the configuration rule provision unit, and to configure the MBSFN sub-frames according to the control signaling;

the control signaling transmission unit 53 is used to send the control signaling generated by the control signaling generation unit to the terminal.

Optionally, the configuration rule provision unit 51 is located in the parent node of the base station to which all the cells bearing the MBMS service in the MBSFN domain belong; the control signaling generation unit 52 and the control signaling transmission unit 53 are located in the base station to which the cells bearing the MBMS service in the MBSFN domain belong.

Optionally, the configuration rule provision unit 51 and the control signaling generation unit 52 are located in the parent node of the base station to which all the cells bearing the MBMS service in the MBSFN domain belong; the control signaling transmission unit 53 is located in the base station to which the cells bearing the MBMS service in the MBSFN domain belong and the parent node of the base station.

Optionally, the configuration rule provision unit 51, the control signaling generation unit 52 and the control signaling transmission unit 53 are located in the base station to which the cells bearing the MBMS service in the MBSFN domain belong.

The configuration rules provided by the configuration rule provision 51 are: uniformly segmenting the MBSFN sub-frames in each cell involved in sending the MBMS service in the MBSFN domain, and uniformly configuring the OFDM symbols occupied by the PDCCH of the MBSFN sub-frames in each segment.

The process of the control signaling generation unit 52 configuring the MBSFN sub-frames is: distributing the corresponding OFDM symbols in the MBSFN sub-frame according to the configuration rule of configuring the OFDM symbols to the PDCCH, and distributing the remaining OFDM symbols in the MBSFN sub-frames to the MBMS service.

The process of the configuration rule provision unit 51 segmenting the MBSFN sub-frames is: segmenting the MBSFN sub-frames according to the MBMS dynamic scheduling period, or the multicast control channel (MCCH) modification period, or the Broadcast Control Channel (BCCH) modification period, or a finite number of successive MBSFN radio frames, or a finite number of successive MBSFN sub-frames.

Said uniformly configuring the OFDM symbols occupied by the PDCCH of the MBSFN sub-frame in each segment according to the configuration rules provided by the configuration rule provision unit 51 is: the OFDM symbols occupied by the PDCCH of all the MBSFN sub-frames bearing the MBMS service are the same, that is, the PDCCH of all MBSFN sub-frames bearing the MBMS service in each segment in each cell in the MBSFN domain occupies the first OFDM symbol or the first two OFDM symbols.

The technical scheme of the present invention will be illustrated in further detail in combination with the specific embodiments in the following.

The First Embodiment

In this embodiment, the configuration rules of configuring the OFDM symbols for the PDCCH are: segmenting the MBSFN sub-frames in each cell bearing the transmission of the multi-cell transmission MBMS service in the MBSFN domain, and each segment comprises the same or different number of the MBSFN sub-frames. Each segment in this embodiment is one MBMS dynamic scheduling period. According to the set segments such as the MBMS dynamic scheduling period, the PDCCH occupies the OFDM symbol must be occupied in the MBSFN sub-frame, or the OFDM symbol must be occupied in the MBSFN sub-frame as well as other OFDM symbols that might be occupied. According to the current LTE R9 protocol, that is, each segment alternately occupies the first OFDM symbol or the first two OFDM symbols in the MBSFN sub-frame. Said alternate occupation might be not even, for example, according to the service scheduling requirements, the MBSFN sub-frames in several successive segments (the MBMS dynamic scheduling period) configure that the PDCCH occupies the first OFDM symbol or the first two OFDM symbols.

Figure 6:
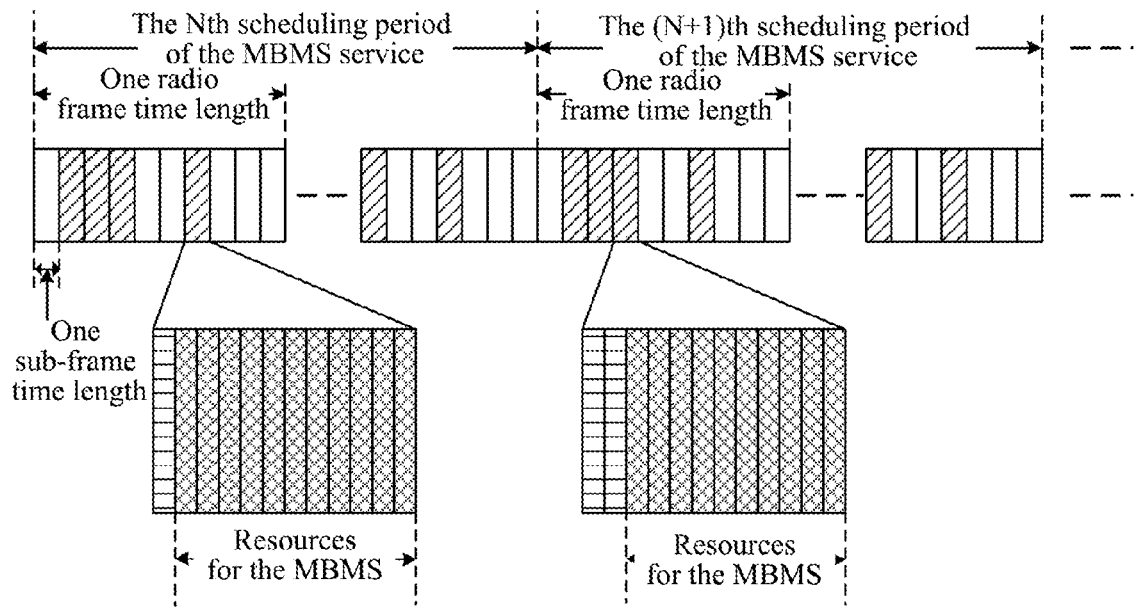
FIG. 6 is a diagram of distributing the OFDM symbols in accordance with the first embodiment of the present invention.

FIG. 6 is a diagram of distributing the OFDM symbols in accordance with the first embodiment of the present invention, as shown in FIG. 6, in the $N^{th}$ (N is a natural number) segment (the MBMS dynamic scheduling period) of the MBMS service, the base station configures the PDCCH with the first OFDM symbol, and the MBMS service with the remaining OFDM symbols (including the $2^{nd}$ OFDM symbol) in the MBSFN sub-frames; in the $(N+1)^{th}$ segment (the MBMS dynamic scheduling period), the base station configures the PDCCH with the first two OFDM symbols and the MBMS service with the remaining OFDM symbols (not including the $2^{nd}$ OFDM symbol) in the MBSFN sub-frames.

The configuration might also be: in the $N^{th}$ (N is a natural number) segment (the MBMS dynamic scheduling period) of the MBMS service, the base station configures the PDCCH with the first OFDM symbol and the MBMS service with the remaining OFDM symbols (including the $2^{nd}$ OFDM symbol) in the MBSFN sub-frames; in the $(N+1)^{th}$, $(N+2)^{th}$ and $(N+3)^{th}$ segments (MBMS dynamic scheduling periods), the base station configures the PDCCH with the first two OFDM symbols and the MBMS service with the remaining OFDM symbols (not including the $2^{nd}$ OFDM symbol) in the MBSFN sub-frames.

The Second Embodiment

In this embodiment, segmenting the MBSFN sub-frames bearing the MBMS service, the configuration of the PDCCH of the MBSFN sub-frames in each segment is the same, the number of the MBSFN sub-frames in each segment might be the same or different (typically it is the same in practical applications). Specifically, how to make segments and the number of MBSFN sub-frames in each segment are determined by the configuration rules, and are uniformly configured in the MBSFN domain, that is, the configuration rules of configuring the OFDM symbols for the PDCCH are: uniformly configuring the number of MBSFN sub-frames (such as 4, however, the number of MBSFN sub-frames included in each segment should be fixed according to the protocol, thus there is no need to notify the receiver about the number of MBSFN sub-frames in each segment) in each segment and the OFDM symbols occupied by the PDCCH in the MBSFN sub-frames in each segment, for example, uniformly configuring the PDCCH with the first OFDM symbol or with the first two OFDM symbols.

Figure 7:
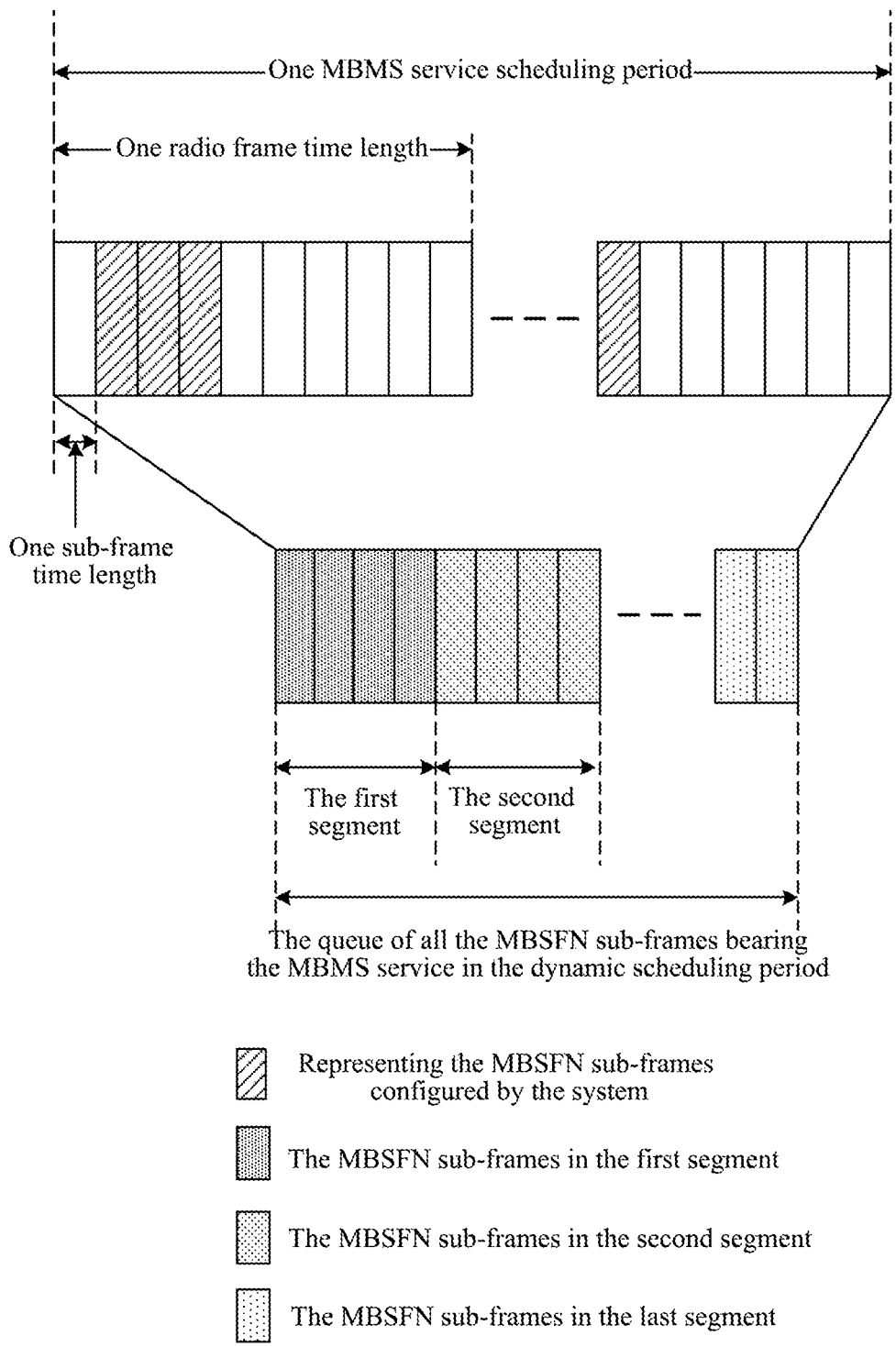
FIG. 7 is a diagram of segmenting the MBSFN sub-frames in accordance with the second embodiment of the present invention.

FIG. 7 is a diagram of segmenting the MBSFN sub-frames in accordance with the second embodiment of the present invention, as shown in FIG. 7, segment the multiple MBSFN sub-frames in one MBMS dynamic scheduling period, each segment maintains four MBSFN sub-frames, the last segment in the figure comprises two MBSFN sub-frames, that is, generally, if the last segment cannot meet the number of MBSFN sub-frames that should be included in each segment as indicated by the configuration rules, the last segment just maintains the number of MBSFN sub-frames as there are in practices. Alternatively, the MBSFN sub-frames in the last segment plus the first two MBSFN sub-frames in the next MBMS dynamic scheduling period can be combined into one segment. This segmenting is not limited to segment the MBSFN sub-frames within one MBMS dynamic scheduling period, but segment all the MBSFN sub-frames in all cells in the MBSFN domain.

Figure 8:
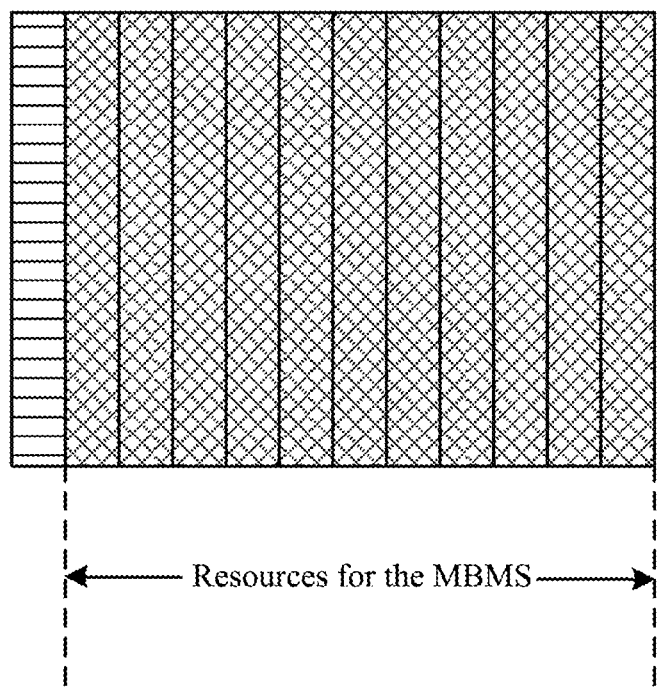
FIG. 8 is a structural diagram of each MBSFN sub-frame in the first segment in accordance with the second embodiment of the present invention.
Figure 8:
Figure 8:
Figure 9:
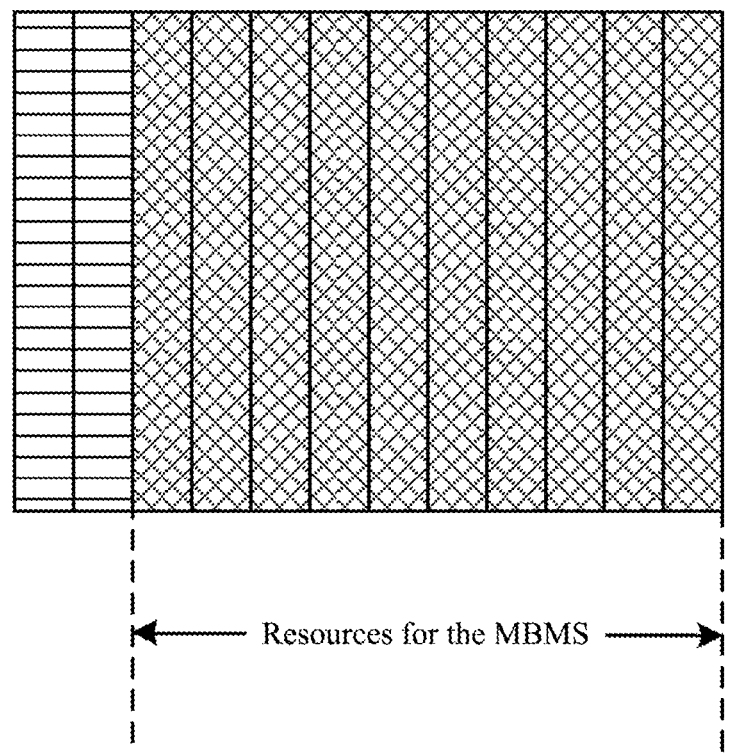
FIG. 9 is a structural diagram of each MBSFN sub-frame in the second segment in accordance with the second embodiment of the present invention.
Figure 9:
Figure 9:
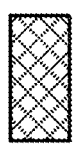

Configuring the PDCCH of the MBSFN sub-frames in each segment with the same OFDM symbols means keeping the OFDM symbols for bearing the MBMS service in the MBSFN sub-frames in each segment the same, for example, the configuration rules assign that the PDCCH of the MBSFN sub-frames in the first segment to occupy the first OFDM symbol, the structure of each MBSFN sub-frame in the first segment is shown as FIG. 8, the PDCCH occupies the first OFDM symbol, and the MBMS service uses the remaining OFDM symbols including the $2^{nd}$ OFDM symbol. If the configuration rules assign the PDCCH of the MBSFN sub-frames in the first segment to occupy the first two OFDM symbols, the structure of each MBSFN sub-frame in the second segment is as shown in FIG. 9, the PDCCH occupies the first two OFDM symbols, and the MBMS service uses the remaining OFDM symbols not including the $2^{nd}$ OFDM symbol, the third segment is the same as the first segment, and so on. Here it is only a specific example which has a variety of simple modifications, for example, the PDCCH in the first segment is configured to occupy the first two OFDM symbols, and the PDCCH in the second segment is configured to occupy one OFDM symbol; alternatively, the PDCCH in the first and second segments is configured to occupy one OFDM symbol, the PDCCH in the third and fourth segments is configured to occupy two OFDM symbols, and the configurations of each two segments are the same, alternatively, the PDCCH in the first segment is configured with one OFDM symbol, the PDCCH in the second, third and fourth segments is configured with two OFDM symbols, that is, in the $N^{th}$ (N is a natural number) segment, when the N meets N mod 4=1, the PDCCH is configured with one OFDM symbol, when the N meets N mod 4≠1, the PDCCH is configured with two OFDM symbols.

The Third Embodiment

In this embodiment, the MBSFN radio frames are segmented (that is, the MBSFN sub-frames are segmented, since segmenting the MBSFN radio frames is actually segmenting the MBSFN sub-frames). The number of MBSFN radio frames in each segment is the same or different (generally the same in practical applications).

Segment all the MBSFN radio frames in one MBMS dynamic scheduling period, or segment the MBSFN radio frames in each cell in the MBSFN domain, the segmenting might cross the MBMS dynamic scheduling periods rather than limited to one MBMS scheduling period.

This embodiment describes segmenting in one MBMS dynamic scheduling period rather than crossing multiple MBMS dynamic scheduling periods, that is, in one MBMS dynamic scheduling period, take one or more MBSFN radio frames bearing the MBMS service as one segment, and the configuration of the OFDM symbols occupied by the MBSFN sub-frames bearing the MBMS service in each segment is the same, and the number of MBSFN sub-frames in each segment is the same or different, that is, the configuration rules of configuring the OFDM symbols for the PDCCH are: uniformly configuring the number of MBSFN radio frames in each segment (in practical applications, the number of MBSFN sub-frames in each segment should be fixed with the protocol, thus it does not need to notify the receiver about the number of MBSFN radio frames included in each segment), and the OFDM symbols occupied by the PDCCH in the MBSFN sub-frames in each segment, for example, the uniform configuration is that the PDCCH occupies the first OFDM symbol or the first two OFDM symbols.

For example, each segment comprises one MBSFN radio frame, then for the multiple MBSFN radio frames in one MBMS dynamic scheduling period, the OFDM symbols configured for the PDCCH of the MBSFN sub-frames bearing the MBMS service in each MBSFN radio frame are the same, that is, the OFDM symbols bearing the MBMS service in the MBSFN sub-frames in each segment are the same. Therefore, when configuring the PDCCH of the MBSFN sub-frames bearing the MBMS service with the first OFDM symbol, the $2^{nd}$ OFDM symbol can be used to bear the MBMS service in this MBSFN domain.

The configuration also might be: for example, it must configure two OFDM symbols for the PDCCH of the MBSFN sub-frames in three cases, and one OFDM symbol for the PDCCH of the MBSFN sub-frames in one case, thus it needs to configure that the number of MBSFN sub-frames whose PDCCH occupies two OFDM symbols is three times of the number of MBSFN sub-frames whose PDCCH occupies one OFDM symbol. One specific configuration method is as follows:

the number of OFDM symbols configured for the PDCCH of the MBSFN sub-frames in the segment satisfies the following equation.

N mod M=1 and N mod M≠1, where N is the segment number and it is a natural number. M=4, and the two cases are that the configuration of the PDCCH of the MBSFN sub-frames is the same, that is, the PDCCH of the MBSFN sub-frames in the MBSFN radio frames that satisfy N mod M=1 is configured with the first OFDM symbol, while the PDCCH of the MBSFN sub-frames in the MBSFN radio frames that satisfy N mod M≠1 is configured with the first two OFDM symbols. This is unbalanced configuration, mainly because the probability that the PDCCH of the MBSFN sub-frames is configured with the first two OFDM symbols is relatively larger according to the existing protocol, thus the PDCCH of more MBSFN sub-frames is configured with two OFDM symbols.

For another example, each section comprises three MBSFN radio frames, then for the multiple MBSFN radio frames in one MBMS dynamic scheduling period, the OFDM symbols configured for the PDCCH of the MBSFN sub-frames bearing MBMS service in every three MBSFN radio frames are the same, that is, the OFDM symbols bearing the MBMS service in the MBSFN sub-frames in each segment remain the same. Therefore, when configuring the PDCCH of the MBSFN sub-frames bearing the MBMS service with the first OFDM symbol, use the second OFDM symbol to bear the MBMS in this MBSFN domain.

For example, each segment comprises four MBSFN radio frames, then for the multiple MBSFN radio frames in one MBMS dynamic scheduling period, each four MBSFN radio frames is a segment, and the OFDM symbols configured for the PDCCH of the MBSFN sub-frames bearing the MBMS service in one of these four MBSFN radio frames are different from those configured for the PDCCH of the MBSFN sub-frames bearing the MBMS service in other three MBSFN radio frames, for example, if the fourth MBSFN radio frame is different from the first three ones, the PDCCH of the MBSFN sub-frames in the first three MBSFN radio frames occupies two OFDM symbols, while the PDCCH of the MBSFN sub-frames in the fourth MBSFN radio frame occupies one OFDM symbol. Therefore, each segment remains the same configuration. Therefore, when the PDCCH of the MBSFN sub-frames bearing the MBMS service is configured with the first OFDM symbol, use the second OFDM symbol to bear the MBMS service in the MBSFN domain.

The segmenting process in the embodiment further is, take one MCCH modification period as one segment, or take one BCCH modification period as one segment. Furthermore, the present invention might segment the MBSFN sub-frames in one MBMS dynamic scheduling period, or one MCCH modification period, or one BCCH modification period, it might not be limited to segment the MBSFN sub-frames in one MBMS dynamic scheduling period, or one MCCH modification period, or one BCCH modification period, that is, the segmenting might cross the MBMS dynamic scheduling periods, or the MCCH modification periods, or the BCCH modification periods. The operations within one segment are those in the aforementioned embodiment.

The above description is only preferred embodiments of the present invention rather than the restriction of the scope of the claims of the present invention.

What is claimed is:

1. An Orthogonal Frequency Division Multiplexing (OFDM) symbol distributing method for Multimedia Broadcast multicast service Single Frequency Network (MBSFN) sub-frame, the method comprising:
   according to uniform configuration rules, an OFDM symbol distributing system distributing OFDM symbols in all MBSFN sub-frames bearing transmission of multi-cell transmission Multimedia Broadcast Multicast Service (MBMS) in a MBSFN area;
   wherein, the MBSFN sub-frames in each cell involved in the transmission of the MBMS in the MBSFN area are uniformly segmented, and then the OFDM symbols of the MBSFN sub-frames in each segment are uniformly configured, wherein the MBSFN sub-frames are segmented according to a size of a Broadcast Control Channel (BCCH) modification period;
   wherein, an OFDM symbol distributing system distributing OFDM symbols in all MBSFN sub-frames bearing transmission of multi-cell transmission Multimedia Broadcast Multicast Service (MBMS) in a MBSFN area comprises: distributing a first OFDM symbol for non-MBMS in all the MBSFN sub-frames bearing transmission of multi-cell transmission MBMS for each cell in the MBSFN area, or distributing first two OFDM symbols for non-MBMS in all the MBSFN sub-frames bearing transmission of multi-cell transmission MBMS for each cell in the MBSFN area, thus making all the MBSFN sub-frames use same OFDM symbol for the non-MBMS.

2. The OFDM symbol distributing method of claim 1, wherein, the configuration rules are:
   uniformly segmenting the MBSFN sub-frames in each cell involved in the transmission of the MBMS in the MBSFN area, and uniformly configuring the OFDM symbols occupied by physical downlink control channel (PDCCH) of the MBSFN sub-frames in each segment.

3. The OFDM symbol distributing method of claim 2, wherein, said distributing the OFDM symbols in all the MBSFN sub-frames bearing the MBMS according to the uniform configuration rules comprises:
   each cell distributing the corresponding OFDM symbols in the MBSFN sub-frames to the PDCCH according to the configuration rules of configuring the OFDM symbols for the PDCCH, and distributing the remaining OFDM symbols in the MBSFN sub-frames to the MBMS.

4. The OFDM symbol distributing method of claim 2, wherein, the uniform configuration in each segment in each cell in the MBSFN area is:
   the OFDM symbols occupied by the PDCCH of all the MBSFN sub-frames bearing the MBMS are the same in each segment, that is, the PDCCH of all the MBSFN sub-frames bearing the MBMS in each segment in each cell in the MBSFN area occupies the first OFDM symbol or the first two OFDM symbols.

5. The OFDM symbol distributing method of claim 2, wherein, the uniform configuration in each segment in each cell in the MBSFN area is:
   the OFDM symbols occupied by the PDCCH of all the MBSFN sub-frames bearing the MBMS are different within the segment, that is, the PDCCH of part of all the MBSFN sub-frames bearing the MBMS in each segment in each cell in the MBSFN area occupies the $1^{st}$ OFDM symbol, and the PDCCH of the remaining MBSFN sub-frames occupies the first two OFDM symbols.

6. The OFDM symbol distributing method of claim 1, wherein, said OFDM symbol distributing system comprises:
   a base station to which all the cells bearing the MBMS in the MBSFN area belong and a parent node of the base station, said OFDM symbol distributing system distributing the OFDM symbols in all MBSFN sub-frames bearing the multi-cell transmission MBMS in the MBSFN area according to the uniform configuration rules is:
   the base station to which all the cells bearing the MBMS in the MBSFN area belong receiving the configuration rules sent by the parent node and used to configure the OFDM symbols for the PDCCH of all MBSFN sub-frames bearing the multi-cell transmission MBMS;
   according to the received configuration rules, the base station generating a control signaling for the PDCCH of the corresponding MBSFN sub-frame occupying the OFDM symbols, and configuring the MBSFN sub-frames according to the control signaling;
   the base station sending the generated control signaling to a terminal.

7. The OFDM symbol distributing method of claim 1, wherein, the OFDM symbol distributing system comprises:
   a base station to which all the cells bearing the MBMS in the MBSFN area belong and a parent node of the base station, said OFDM symbol distributing system distributing the OFDM symbols in all MBSFN sub-frames bearing the multi-cell transmission MBMS in the MBSFN area according to the uniform configuration rules is:
   the parent node of the base station to which all the cells bearing the MBMS in the MBSFN area belong generating a control signaling for the PDCCH of the corresponding MBSFN sub-frames occupying the OFDM symbols;
   the parent node of the base station sending the generated control signaling to the base station to which all the cells bearing the MBMS belong;
   after receiving the control signaling sent from the parent node, the base station configuring the MBSFN sub-frame according to the control signaling and forwarding the control signaling to a terminal.

8. The OFDM symbol distributing method of claim 1, wherein, the OFDM symbol distributing system is a base station to which all cells bearing the MBMS in the MBSFN area belong,
   said OFDM symbol distributing system distributing the OFDM symbols in all MBSFN sub-frames bearing the multi-cell transmission MBMS in the MBSFN area according to the uniform configuration rules is:
   the base station to which all the cells bearing the MBMS in the MBSFN area belong configuring the OFDM symbols according to the fixed configuration rules of configuring the OFDM symbols for the PDCCH of all the MBSFN sub-frames;
   according to the configuration rules, the base station generating a corresponding control signaling for the PDCCH of all the MBSFN sub-frames to occupy the OFDM symbols, and configuring the MBSFN sub-frames according to the control signaling;
the base station sending the generated control signaling to a terminal.

9. An Orthogonal Frequency Division Multiplexing (OFDM) symbol distributing system for Multimedia Broadcast multicast service Single Frequency Network (MBSFN) sub-frame, the system comprising:
a base station to which all cells bearing MBMS in a MBSFN area belong and a parent node of the base station, wherein,
the parent node is configured to provide uniform configuration rules to the base station;
the base station is configured to generate a control signaling for physical downlink control channel (PDCCH) of the corresponding MBSFN sub-frames occupying OFDM symbols according to the configuration rules, and to configure the MBSFN sub-frames according to the control signaling;
the base station is further configured to send the control signaling generated to a terminal;
or, the system comprising a base station to which all cells bearing MBMS in a MBSFN area belong and a parent node of the base station, wherein,
the parent node is configured to provide uniform configuration rules, and generate a control signaling for physical downlink control channel (PDCCH) of the corresponding MBSFN sub-frames occupying OFDM symbols according to the configuration rules, and to configure the MBSFN sub-frames according to the control signaling;
the base station is configured to forward the control signaling received from the parent node to a terminal;
or, the system comprising a base station to which all cells bearing MBMS in a MBSFN area belong, wherein, the base station is configured to generate a control signaling for physical downlink control channel (PDCCH) of the corresponding MBSFN sub-frames occupying OFDM symbols according to preset configuration rules, and to configure the MBSFN sub-frames according to the control signaling; and further configured to send the control signaling generated to a terminal;
wherein, the configuration rules are: uniformly segmenting the MBSFN sub-frames in each cell involved in the MBMS in the MBSFN area, and uniformly configuring the OFDM symbols occupied by the PDCCH of the MBSFN sub-frames in each segment;
wherein, said segmenting the MBSFN sub-frames is: segmenting the MBSFN sub-frames according to a size of a Broadcast Control Channel (BCCH) modification period;
wherein, the base station is further configured to: distribute a first OFDM symbol for non-MBMS in all the MBSFN sub-frames bearing transmission of multi-cell transmission MBMS for each cell in the MBSFN area, or distribute first two OFDM symbols for non-MBMS in all the MBSFN sub-frames bearing transmission of multi-cell transmission MBMS for each cell in the MBSFN area, thus making all the MBSFN sub-frames use same OFDM symbol for the non-MBMS.

10. The OFDM symbol distributing system of claim 9, wherein, configuring the MBSFN sub-frames is:
distributing the corresponding OFDM symbols in the MBSFN sub-frames to the PDCCH according to the configuration rules of configuring the OFDM symbols for the PDCCHs, and distributing the remaining OFDM symbols in the MBSFN sub-frames to the MBMS.

11. The OFDM symbol distributing system of claim 9, wherein, uniformly configuring the OFDM symbols occupied by the PDCCH of the MBSFN sub-frames in each segment in the configuration rules provided comprises:
the OFDM symbols occupied by the PDCCH of all the MBSFN sub-frames bearing the MBMS are the same in one segment, that is, the PDCCH of all the MBSFN sub-frames bearing the MBMS in each segment in each cell in the MBSFN area occupies the $1^{st}$ OFDM symbol or the first two OFDM symbols.

\* \* \* \* \*